United States Patent
Kim

(10) Patent No.: US 11,143,137 B1
(45) Date of Patent: Oct. 12, 2021

(54) ENGINE SYSTEM, COMBUSTION CONTROL SYSTEM, AND OPERATING METHOD WITH CLOSE-COUPLED EARLY PILOTS AND CYLINDER TEMPERATURE CONTROL

(71) Applicant: Caterpillar Inc., Peoria, IL (US)

(72) Inventor: Charlie Chang-Won Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/891,170

(22) Filed: Jun. 3, 2020

(51) Int. Cl.
| | |
|---|---|
| *F02D 41/40* | (2006.01) |
| *F02D 13/02* | (2006.01) |
| *F02D 41/00* | (2006.01) |
| *F02M 51/00* | (2006.01) |
| *F02B 9/04* | (2006.01) |
| *F02D 41/38* | (2006.01) |

(52) U.S. Cl.
CPC .............. *F02D 41/403* (2013.01); *F02B 9/04* (2013.01); *F02D 13/0234* (2013.01); *F02D 41/009* (2013.01); *F02M 51/00* (2013.01); *F02D 2041/389* (2013.01); *F02D 2200/021* (2013.01)

(58) Field of Classification Search
CPC .. F02D 41/403; F02D 13/0234; F02D 41/009; F02D 2200/021; F02D 2041/389; F02B 9/04; F02M 51/00
See application file for complete search history.

(56) References Cited

U.S. PATENT DOCUMENTS

| | | | |
|---|---|---|---|
| 6,276,334 B1 | 8/2001 | Flynn et al. | |
| 6,505,601 B1 | 1/2003 | Jorach et al. | |
| 6,907,870 B2 | 6/2005 | Zur Loye et al. | |
| 6,915,776 B2 | 7/2005 | zur Loye et al. | |
| 7,841,308 B1 | 11/2010 | Muth | |
| 10,273,894 B2 | 4/2019 | Tripathi | |
| 2008/0172169 A1* | 7/2008 | Kuronita | F02D 41/1448 701/103 |
| 2008/0243358 A1* | 10/2008 | Kojima | F02D 35/025 701/102 |
| 2011/0005491 A1* | 1/2011 | Terada | F02D 41/403 123/299 |
| 2013/0146037 A1 | 6/2013 | Han et al. | |
| 2014/0190452 A1* | 7/2014 | Ikeda | F02M 69/46 123/472 |

(Continued)

FOREIGN PATENT DOCUMENTS

JP 11294228 A * 10/1999 ........... F02D 41/403

*Primary Examiner* — Joseph J Dallo
(74) *Attorney, Agent, or Firm* — Brannon Sowers & Cracraft

(57) ABSTRACT

Operating a direct-injection compression-ignition engine includes injecting early pilot shots of fuel, and controlling a cylinder temperature timing to combust the early pilot shots according to a combustion phasing that is based on the cylinder temperature timing. A main charge of the fuel is combusted based on the combustion of the early pilot shots. A combustion control unit is structured to command actuation of a fuel injector and a cylinder temperature controller to phase combustion of early pilot shots of the fuel, prior to a TDC position of a piston in an engine cycle. The cylinder temperature controller is a variable valve actuator or other apparatus controlling cylinder temperature in a manner decoupled from piston position.

20 Claims, 4 Drawing Sheets

(56) References Cited

U.S. PATENT DOCUMENTS

2015/0300283 A1* 10/2015 Nakajima ........... F02D 41/0052
  701/109
2018/0320616 A1* 11/2018 Hoshi ..................... F02D 35/02
2018/0328307 A1* 11/2018 Kurtz ................... F02D 41/008

* cited by examiner

ENGINE SYSTEM, COMBUSTION CONTROL SYSTEM, AND OPERATING METHOD WITH CLOSE-COUPLED EARLY PILOTS AND CYLINDER TEMPERATURE CONTROL

This patent application includes subject matter developed under U.S. Government Contract No. DE-EE0008476. The Government has certain rights in this invention.

TECHNICAL FIELD

The present disclosure relates generally to operating a direct-injection compression-ignition engine, and more particularly to phasing combustion of close-coupled early pilot shots of fuel based on a controlled cylinder temperature timing.

BACKGROUND

Internal combustion engines are well-known and widely used throughout the world for diverse purposes ranging from providing torque for machine propulsion to generating electrical energy for electrically powered machines and electrical power grids. In a typical example, a fuel is combusted with air in a cylinder in an engine to drive a piston in response to a rapid pressure and temperature rise in the cylinder. The piston is coupled with a crankshaft and causes the crankshaft to rotate, for turning parts in a machine system. Spark-ignited engines are typically operated on gasoline or gaseous fuels such as natural gas, and generally time ignition of the fuel and air based upon a timing of spark production. Compression-ignition engines commonly use diesel, biodiesel, or various blends, and compress the fuel and air in the cylinder to an autoignition threshold, with the timing of ignition generally dependent upon the timing of occurrence of the autoignition conditions.

In recent years increased attention has been given to technology for operating internal combustion engines to produce reduced levels of certain emissions, notably oxides of nitrogen or "NOx" and particulate matter, chiefly soot. In an effort to continually improve emissions without sacrificing other performance criteria such as power, responsiveness, and fuel efficiency, engineers have developed a great variety of different strategies for precisely and controllably delivering the fuel to be combusted. In the case of compression-ignition engine systems in particular optimized timing, number, rate shape, injection pressure, and other fuel injection control targets have been the subject of enormous engineering effort. Relative amounts of exhaust constituents, such as soot, oxides of nitrogen (NOx), unburned hydrocarbons, and carbon monoxide, as well as fuel efficiency can be affected by varying these and other fueling parameters.

One fuel injection strategy adopted in diesel engines employs a pilot shot of fuel that is injected in advance of a main shot or main charge of injected fuel, and produces conditions in the cylinder that can assist in rapidly, efficiently, and cleanly combusting the main charge. Post injections are sometimes injected after the main charge to provide a cleanup combustion helping to completely burn as much residual fuel of the main charge as is practicable. While pilot injection strategies have shown promise, they have yet to deliver upon their full theoretical potential in many instances. One example pilot injection strategy in a liquid-fuel compression-ignition engine is known from U.S. Pat. No. 6,691,671 to Duffy et al.

SUMMARY OF THE INVENTION

In one aspect, a method of operating a direct-injection compression-ignition engine includes moving a piston in a cylinder in the engine from a bottom dead center (BDC) position to a top dead center (TDC) position in an engine cycle, and injecting early pilot shots of a fuel into the cylinder during the moving of the piston from the BDC position to the TDC position. The method further includes injecting a main charge of the fuel into the cylinder after the injection of the early pilot shots, and controlling a cylinder temperature timing in the engine cycle. The method still further includes combusting the early pilot shots in the cylinder, prior to the TDC position of the piston in the engine cycle, according to a combustion phasing that is based on the cylinder temperature timing, and igniting the main charge in the cylinder based upon the combustion of the early pilot shots.

In another aspect, a direct-injection compression-ignition engine system includes an electrically actuated fuel injector structured to directly inject a fuel into a cylinder in an engine, and an electrically actuated cylinder temperature controller. The engine system further includes a combustion control unit in communication with the fuel injector and with the cylinder temperature controller. The combustion control unit is structured to command actuation of the fuel injector to inject early pilot shots of the fuel into the cylinder during moving a piston in the cylinder from a bottom dead center (BDC) position to a top dead center (TDC) position in an engine cycle. The combustion control unit is further structured to command actuation of the fuel injector to inject a main charge of the fuel into the cylinder after injection of the early pilot shots, and to command actuation of the cylinder temperature controller to control a cylinder temperature timing. The combustion control unit is still further structured to phase combustion of the early pilot shots, prior to the TDC position of the piston in the engine cycle, based upon the controlling of the cylinder temperature timing.

In still another aspect, a combustion control system for an engine includes a combustion control unit structured to command actuation of a fuel injector, for directly injecting a fuel into a cylinder in the engine, and a cylinder temperature controller, for controlling a cylinder temperature decoupled from a position of a piston within the cylinder. The combustion control unit is further structured to command actuation of the fuel injector to inject early pilot shots of the fuel into the cylinder during moving the piston from a bottom dead center (BDC) position to a top dead center (TDC) position in an engine cycle, and to command actuation of the fuel injector to inject a main charge of the fuel into the cylinder after injection of the early pilot shots in the engine cycle. The combustion control unit is still further structured to command actuation of the cylinder temperature controller to control a cylinder temperature timing, and to phase combustion of the early pilot shots, prior to the TDC position of the piston in the engine cycle, based upon the cylinder temperature timing

DETAILED DESCRIPTION

Figure 1:
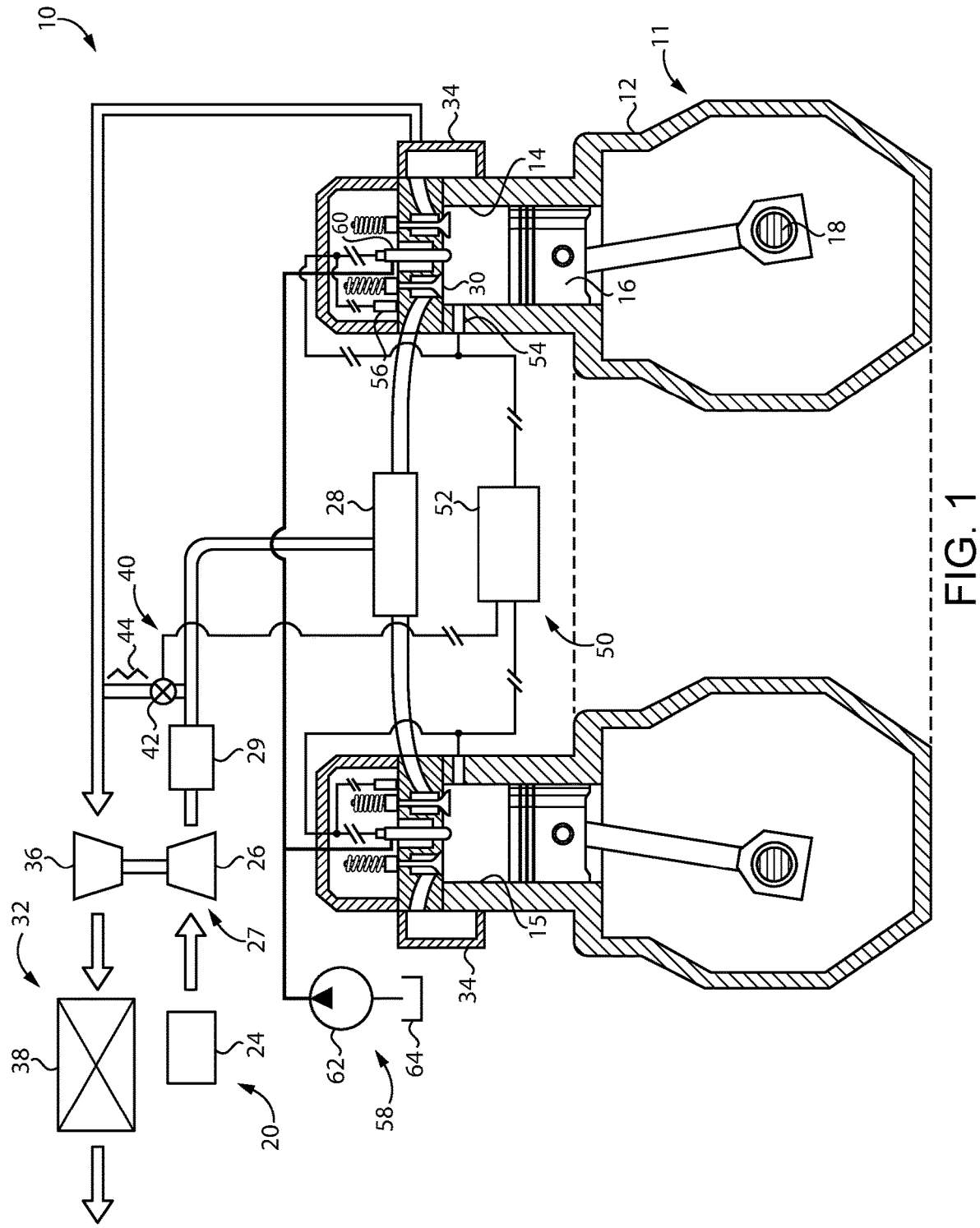
FIG. 1 is a diagrammatic view of a direct-injection compression-ignition engine system, according to one embodiment.

Referring to FIG. 1, there is shown a direct-injection compression-ignition engine system 10 according to one embodiment. Engine system 10 includes an engine 11 having an engine housing 12 with a plurality of cylinders 14 and 15 formed therein. Engine 11 could include a single cylinder engine in some embodiments but will typically include a plurality of cylinders, in any suitable arrangement such as a V-pattern, an inline pattern, or still another. The following description of a single cylinder 14 and associated hardware will be understood to refer to any of the cylinders which may be formed in engine housing 12. A piston 16 is positioned within cylinder 14 and movable between a top dead center (TDC) position and a bottom dead center (BDC) position, and in a compression stroke will increase a mixture of a directly injected fuel and air in cylinder 14 to an autoignition threshold as further discussed herein. Piston 16 is coupled with crankshaft 18 in a generally conventional manner.

Engine system 10 further includes an intake system 20 having an air inlet 24, a compressor 26 in a turbocharger 27, and an aftercooler 29, and is structured to feed intake air for combustion to an intake manifold 28 distributing intake air to cylinders 14 and 15. An intake valve 30 is associated with cylinder 14 and movable to control fluid communication between cylinder 14 and intake manifold 28. Engine system 10 also includes an exhaust system 32 having an exhaust manifold 34, a turbine 36 of turbocharger 27, and one or more aftertreatment devices 38 such as a diesel particulate filter or DPF, a selective catalytic reduction device or SCR for NOx reduction, a diesel oxidation catalyst or DOC, for example.

Engine system 10 may further include an exhaust gas recirculation system 40 having an exhaust gas recirculation or EGR valve 42, and an EGR cooler 44. EGR cooler 44 could be positioned upstream of, or downstream of, EGR valve 42, relative to intake manifold 28, and can be low pressure loop EGR or high pressure loop EGR. Gases conveyed to cylinder 14 for combustion can thus include intake air and a selectable proportion of recirculated exhaust gas, which may be cooled for purposes that will be apparent from the following description. Engine systems without any EGR may still fall within the scope of the present disclosure. Engine system 10 will typically not be configured to supply a fuel into the intake gases, as all of the fuel will typically be directly injected, as further discussed herein.

Engine system 10 also includes a fuel system 58 having an electrically actuated fuel injector 60 positioned so as to extend into cylinder 14, and one or more fuel pumps 62 structured to convey a fuel, such as a liquid diesel distillate fuel from a fuel tank 64 to fuel injector 60. Fuel injector 60 may have any of a variety of internal components, including a solenoid-actuated injection control valve, a cam-actuated or hydraulically-actuated plunger, a pilot valve, an outlet needle check, or others, for purposes of the present disclosure, and all of which are well known. Fuel system 58 could include unit pumps each coupled with one of a plurality of fuel injectors, a common rail or other pressurized fuel reservoir, or still another configuration.

Engine system 10 further includes a combustion control system 50 including a combustion control unit 52 in control communication with fuel injector 60, and an electrically actuated cylinder temperature controller 56. Cylinder temperature controller 56 can include a variable valve actuator, for example a solenoid actuator, structured to hold open intake valve 30 independently of a closing timing that would otherwise be dictated by an engine cam and return spring. A variable valve actuator could also be hydraulically actuated in the context of the present disclosure. A hydraulically actuated variable valve actuator, or other cylinder temperature controller, may also be electrically actuated using a solenoid and armature or other electrical actuator in a control valve, a pilot valve, or the like. A variable valve actuator could also be structured to close intake valve 30 early, prior to the TDC position of piston 16. Those skilled in the art will appreciate the control of cylinder temperature that can be obtained by varying an intake valve closing timing in a so-called Miller cycle, or variant of a Miller cycle, which can be implemented according to the present disclosure. A cam phaser could be used to retard or advance valve closing timing to control cylinder temperature. Varying intake and exhaust valve overlap, or reopening an exhaust valve after initially closing or partially closing the exhaust valve, provide still further strategies. A direct adjustment to geometric compression ratio, such as by way of an adjustable volume fluidly connected to cylinder 14 could also be used. In still other instances, a cylinder temperature controller according to the present disclosure could additionally or alternatively be an electrically actuated EGR valve such as EGR valve 42 that can vary a supply of cooled recirculated exhaust gas into intake system 20, or adjust a flow of coolant to vary a relative cooling of exhaust gas to be recirculated. The present disclosure is not limited with regard to the techniques, known or hereafter developed, that can be used to control cylinder temperature and cylinder temperature timing, as further discussed herein, and such techniques could be used alone or in combination.

Combustion control system 50 further includes a phasing sensor 54 structured to produce phasing data indicative of at least one of a heat release timing, pattern, or rate from combustion of fuel in cylinder 14. The phasing data includes phasing data from the combustion of early pilot shots, used to control actuation of cylinder temperature controller 56. In one embodiment, combustion control unit 52 is structured to determine a deviation in phasing from a desired phasing based on the phasing data, produced in connection with a prior engine cycle, and reduce or eliminate deviation from a desired phasing in a subsequent engine cycle, based on commanded actuation of cylinder temperature controller 56, as further discussed herein. Phasing sensor 54 can be a cylinder pressure sensor exposed to a fluid pressure of cylinder 14, mounted in a cylinder block or a cylinder head of engine housing 12.

Figure 2:
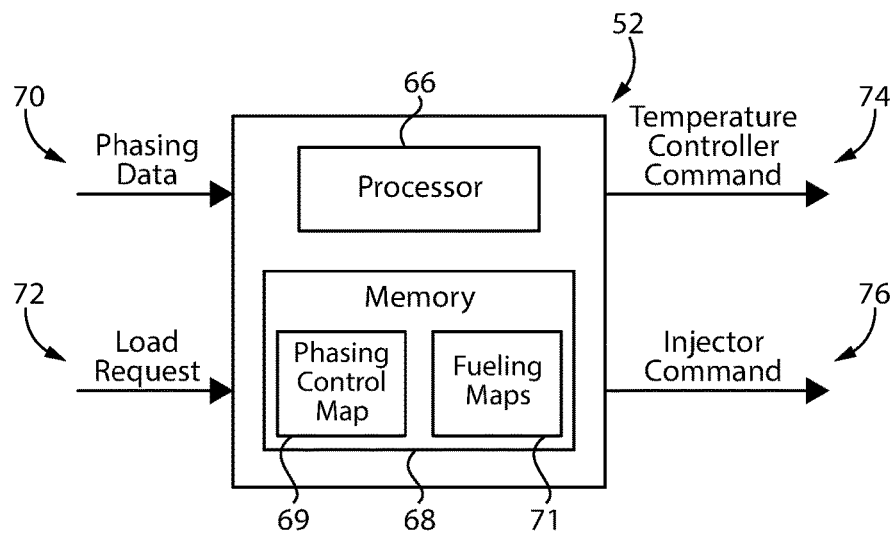
FIG. 2 is a schematic view of a combustion control unit, according to one embodiment.

Referring also now to FIG. 2, there are shown additional features of combustion control unit 52. Combustion control unit 52 is in communication with fuel injector 60 and with cylinder temperature controller 56 as noted above. Combustion control unit 52 includes a processor 66, such as a microprocessor, a microcontroller, or any other suitable central processing unit or CPU. Combustion control unit 52 also includes a memory 68, which may store a phasing control map 69 and one or more fueling maps 71. Memory 68 can include any suitable computer readable memory such as RAM, ROM, EEPROM, DRAM, SDRAM, flash, a hard drive, or still another. Processor 66 may receive inputs during operation and, based upon execution of computer executable code stored on memory 68, produce control commands. In the illustration of FIG. 2, processor 66 receives a phasing data input 70, such as from phasing sensor 54, and a load request input 72 such as from an operator input device or another computer and, respectively, produces a temperature controller command 74 for cylinder temperature controller 56 and an injector command 76 for fuel injector 60. Cylinder temperature timing and fuel injection may each be varied from one engine cycle to a next succeeding engine cycle, and monitored and adjusted continuously, periodically, or where certain deviation or error thresholds are met.

Combustion control unit 52 is further structured to command actuation of fuel injector 60 to inject early pilot shots of fuel into cylinder 14 during moving piston 16 in cylinder 14 from the BDC position to the TDC position in an engine cycle, and to command actuation of fuel injector 60 to inject a main charge of the fuel into cylinder 14 after injection of the early pilot shots in the engine cycle. Combustion control unit 52 is further structured to command actuation of cylinder temperature controller 56 to control a cylinder temperature timing, and to phase combustion of the early pilot shots, prior to the TDC position of piston 16 in the engine cycle, based upon controlling of the cylinder temperature timing. The main charge of fuel is ignited based upon the combustion of the early pilot shots, and is ignited without any electrical spark or so-called liquid spark.

Cylinder temperature timing can be understood as a timing, relative to piston position, of the occurrence of cylinder temperature(s) that affects combustion phasing. Affecting combustion phasing means affecting at least one of a timing, a rate, or a duration, of the heat release of combustion, relative to a timing of the engine system in an engine cycle. Put differently, cylinder temperature timing can be understood as a cylinder temperature history in an engine cycle. Cylinder temperature timing is decoupled from piston position in engine system 10 since by operating cylinder temperature controller 56 cylinder temperature at any instant may not be directly dependent upon a position of piston 16, but in addition or instead, dependent upon the state of an intake valve, an exhaust valve, a coolant valve, EGR valve, etc., as discussed herein. In one embodiment, commanding actuation of cylinder temperature controller 56 to control cylinder temperature timing can include controlling an autoignition temperature timing for early pilot shots, in other words, a timing at which the early pilot shots will autoignite. Based on these principles combustion control unit 52 may be understood to command actuation of cylinder temperature controller 56 to shift the phasing of combustion of the early pilot shots closer to or further from the TDC position of piston 16.

According to the present disclosure, controlling cylinder temperature timing enables the phasing of combustion of early pilot shots to be shifted relatively closer to the TDC position of piston 16 than what would be observed without controlling cylinder temperature timing. As such, the combustion does not unduly oppose piston travel, thereby limiting any fuel efficiency penalty that might otherwise be observed where combustion of the early pilot shots occurs earlier. Phasing of combustion of the main charge is less affected, if at all, by the controlling of the cylinder temperature timing. Thus, according to the present disclosure the combustion phasing of early pilot shots may be dependent, to a greater relative extent, upon the cylinder temperature timing, and the combustion phasing of the main charge dependent, to a lesser relative extent, upon the cylinder temperature timing. By controlling cylinder temperature timing, combustion phasing of the early pilots can thus be optimized, and varied engine cycle to engine cycle, without undesirably impacting combustion phasing of the main charge. Relatively lower NOx emissions can also be expected as the cylinder temperatures will tend to be lower due to delayed combustion phasing of the early pilot shots with cylinder temperature control.

Figure 3:
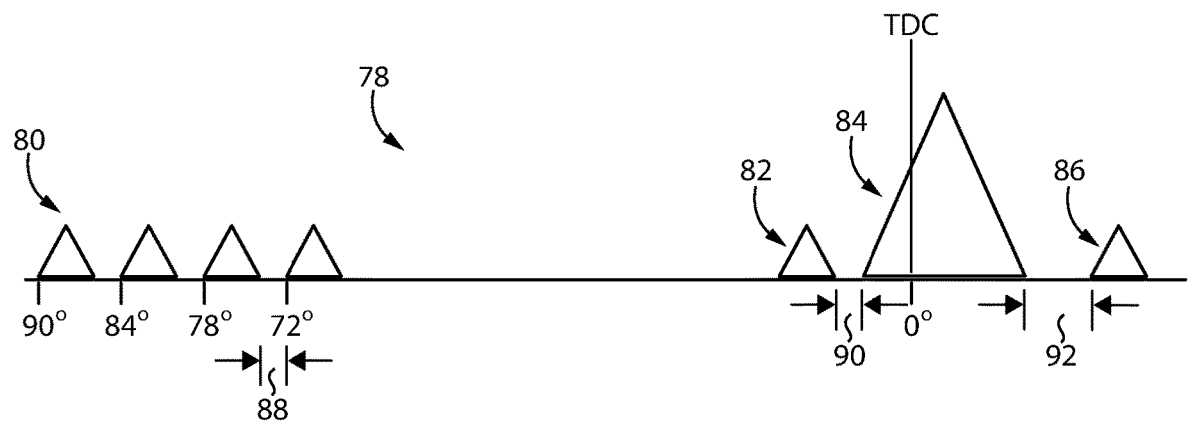
FIG. 3 is a chart of fuel injections in an engine cycle, according to one embodiment.

Referring also now to FIG. 3, there is shown a chart 78 illustrating example injection of early pilot shots and injection of a main charge, all of liquid diesel distillate fuel in this example, according to an example implementation. In chart 78 a plurality of early pilot shots are shown at 80. A late pilot shot is shown at 82, and a main charge is shown at 84. A post injection is shown at 86. Combustion control unit 52 may be structured to command actuation of fuel injector 60 to inject early pilot shots 80 in a close-coupled cluster of three or more pilot shots prior to 60° before the TDC position of piston 16. Close-coupled means close in time, and closer in time to one another than to other fuel injections, including other pilot shots or a main charge. Combustion control unit 52 may be further structured to command actuation of fuel injector 60 to inject four or more early pilot shots between 100° before the TDC position of piston 16 and 70° before the TDC position of piston 16. In the illustrated embodiment, four early pilot shots 80 are injected respectively at about 90°, 84°, 78°, and 72°, before the piston TDC position or 0° crank angle.

Combustion control unit 52 may also be structured to command actuation of fuel injector 60 to inject late pilot shot 82, closer in time to the injection of main charge 84 than to the injection of early pilot shots 80. In other words, a time duration between injection of late pilot shot 82 and main charge 84 may be less than a time duration between the latest early pilot shot 80 and late pilot shot 82. Combustion control unit 52 may also be structured to schedule dwell times between early pilot shots 80, and between late pilot shot 82 and main charge 84, that are equal. In FIG. 3 a dwell time is shown at 88 representing a dwell time between the individual ones of early pilot shots 80. Another dwell time is shown at 90 between late pilot shot 82 and main charge 84, and a third dwell time is shown at 92 between main charge 84 and post injection 86. Dwell times 88 and 90 might be equal in some embodiments, for instance each equal to about 200 microseconds. Dwell time 92 might be about 1000 microseconds. The term "about" can be understood to mean generally or approximately, including accurate within conventional rounding or measurement error as would be understood by a person of skill in the relevant art.

During operation an injection quantity of main charge 84 may be adjusted, based upon fueling map(s) 71, to provide a desired engine power output based upon load request 72. Early pilots 80, and potentially late pilot 82, where used, may be injected with amounts and at times that are not typically adjusted engine cycle to engine cycle based upon engine load changes. A deviation in phasing from a desired phasing may be determined by combustion control unit 52, and the deviation reduced (or eliminated) engine cycle to engine cycle by varying the closing timing of intake valve 30 or another cylinder temperature control parameter. A closing timing of intake valve 30, for instance a timing after the BDC position of piston 16, can be adjusted based upon phasing data 70 and using phasing control map 69. The deviation in phasing could be degrees of crank angle earlier or later than a reference point, for instance, a crank angle where "X" % of the fuel injected in all the pilot shots has burned. Additional or alternative cylinder temperature control techniques as discussed herein could be analogously manipulated to phase combustion of early pilot shots so as to have a heat release timing relatively closer to or further from the TDC position of piston 16.

Pilot shots according to the present disclosure may range from about 2 mg to about 8 mg in amount and, as discussed herein, may be injected prior to 60 degrees before the TDC position of piston 16. The implementation of multiple, small pilot shots in this general timing range, and in combination with suitable injection pressures, spray angle, shot-to-shot dwell times, and other properties provide an amount of pilot fuel that is sufficient to bring about a relatively slow, lower-temperature initial combustion prior to the TDC position of piston 16 that proceeds to initiate a smooth, clean combustion of the main charge. At the injection timings contemplated herein, prior to 60 degrees before TDC, the gases in a cylinder are substantially less dense than the cylinder gases closer to TDC, and as a result have relatively low resistance to penetration of pilot shot injections. For this reason, and also basic injector hardware and controllability limitations, certain earlier pilot injection strategies have required a relatively smaller number of pilot shots, larger pilot shot amounts, and later pilot shot timing to avoid spraying the cylinder walls. According to the present disclosure, combustion of the fuel injected in the pilot shots can occur relatively close to the center of the cylinder. By controlling cylinder temperature timing, phasing of combustion of the pilot shots can be shifted relatively closer to TDC than what might otherwise occur. As a result, the capability for combustion of the pilot shots to advantageously affect the combustion of the main charge can be optimized while also limiting any efficiency penalty, that might otherwise be observed.

Figure 4:
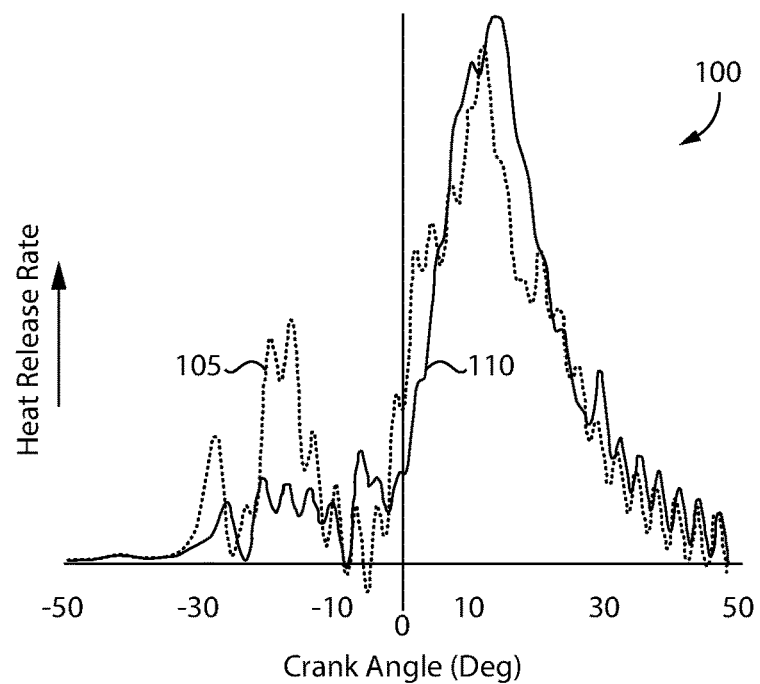
FIG. 4 is a graph of heat release from combustion of a fuel, according to the present disclosure, in comparison to a known strategy.

Referring also now to FIG. 4, there is shown a graph 100 illustrating a heat release rate curve 105 that might be observed in connection with operating an engine system according to the present disclosure, using multiple early pilot shots and cylinder temperature timing control as discussed herein, in comparison to a heat release rate curve 110 that might be observed in an engine system employing a known pilot injection strategy, using cylinder temperature timing control. Heat release rate curve 105 might be observed for three, four, or five, for example, pilot shots, injected up to or before 60° before TDC as disclosed herein. Heat release rate curve 110 might be observed where one or two pilot injections are used, closer in time to the TDC position of a piston than in the present disclosure, including at least one pilot shot after 50° before TDC. The more robust heat release prior to about 10° before the TDC position in heat release rate curve 105 is readily apparent. Moreover, from heat release rate curve 105 it can be seen that start of combustion is earlier than in heat release rate curve 110 for the main charge injected at or just prior to TDC.

Figure 5:
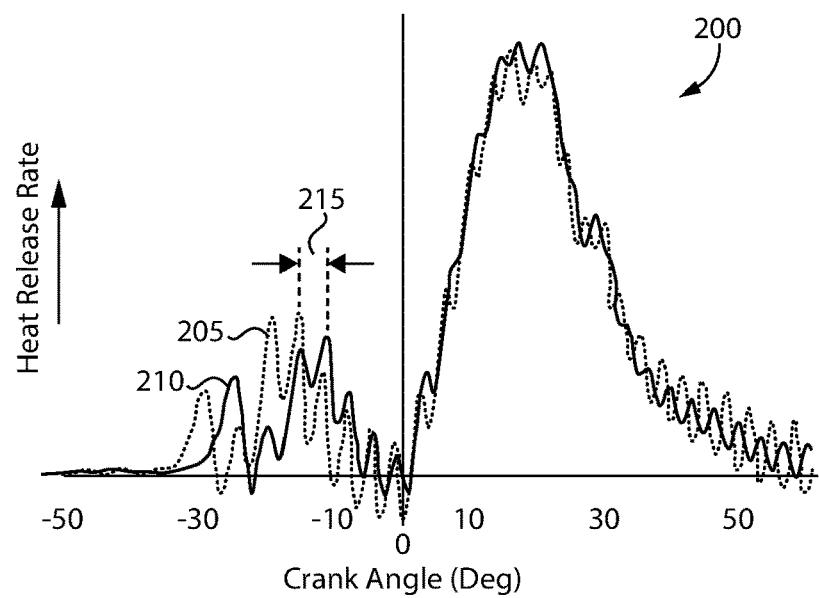
FIG. 5 is a graph of heat release from combustion of a fuel at a higher cylinder temperature versus a lower cylinder temperature.

Referring also now to FIG. 5, there is shown a heat release rate curve 205 for a relatively higher cylinder temperature as compared to a heat release rate curve 210 at a relatively lower cylinder temperature. The differences between heat release rate curve 205 and 210 might be observed by retarding intake valve closing timing relatively later past a piston BDC position in the case of curve 210 than in the case of curve 205, or using another of the temperature control techniques contemplated herein. It will be recalled that combustion phasing of early pilot shots may be dependent, to a greater relative extent, upon cylinder temperature timing, and combustion phasing of the main charge may be dependent, to a lesser relative extent, upon cylinder temperature timing. In FIG. 5, a time duration or offset between heat release rate curve 205 and heat release rate curve 210 associated with combustion of pilot shots prior to a piston TDC position is shown at 215. Offset between heat release rate curves 205 and 210 associated with combustion of a main charge after a piston TDC position is minimal or nonexistent. It can thus be seen that curve 210 is shifted by time duration 215 closer to the TDC piston position or zero crank angle state of piston 16 relative to curve 205. Fuel efficiency may also be greater in the case of curve 210 than curve 205 given the phasing closer to TDC and thus less relative opposition to the piston travel as the TDC piston position is approached.

INDUSTRIAL APPLICABILITY

Figure 6:
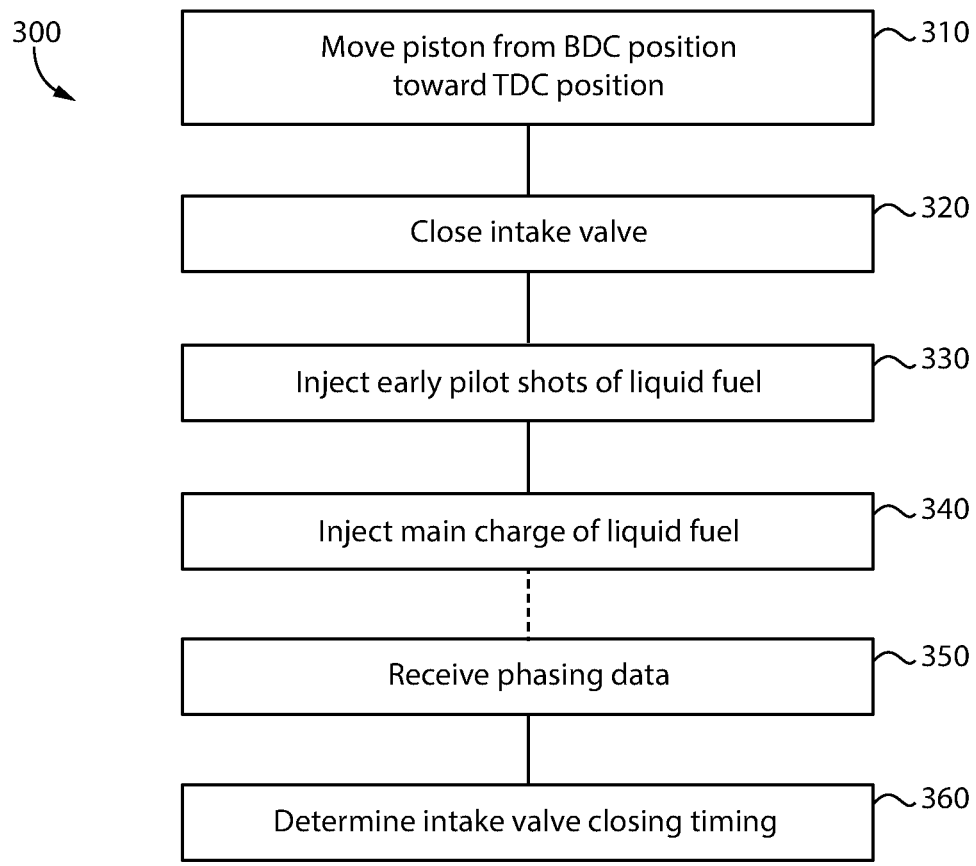
FIG. 6 is a flowchart illustrating example methodology and logic flow, according to one embodiment.

Referring to the drawings generally, but also now to FIG. 6, there is shown a flowchart 300 illustrating example methodology and control logic flow according to the present disclosure. During operating engine system 10, piston 16 is moved between the TDC position and the BDC position in an intake stroke, a compression stroke, an expansion stroke or power stroke, and an exhaust stroke. Moving piston 16 in cylinder 14 from the BDC position to the TDC position in a compression stroke in an engine cycle could include moving piston in a partial stroke where intake valve 30 is held open past the BDC position, and cylinder pressure is not increased, and a partial stroke where intake valve 30 is closed and the pressure in cylinder 14 is increased. In the case of an early intake valve closing the intake stroke could include a partial stroke with intake valve 30 open, and a partial stroke with intake valve 30 closed.

At a block 310 piston 16 is moved from the BDC position toward the TDC position. After commencing moving piston 16 from the BDC position, intake valve 30 is closed as shown at a block 320. After or upon closing intake valve 30 combustion control unit 52 commands actuation of fuel injector 60 to inject early pilot shots of liquid fuel. After the injection of the early pilot shots, a late pilot shot of liquid fuel, if used, may be injected by way of commands from combustion control unit 52. At a block 340, combustion control unit 52 commands actuation of fuel injector 60 to inject the main charge of the fuel. Because the timing of closing intake valve 30 affects cylinder temperature, in turn affecting a timing of heat release from combustion of the early pilot shots, the timing of closing intake valve 30 controls the phasing of combustion of early pilot shots. The early pilot shots will combust in cylinder 14, prior to the TDC position of piston 16, according to a combustion phasing that is based on the cylinder temperature timing. The main charge is combusted based upon the combustion of the early pilot shots, and may combust in a manner that is initially smoother, lower-temperature, and ultimately according to a narrower phasing of heat release than might otherwise be observed in strategies having later injected pilots or no cylinder temperature control. Phasing data is received at a block 350, and can be used to determine a deviation in phasing, including a shift in a timing of heat release from a desired timing of heat release, which deviation is then reduced or eliminated in a subsequent engine cycle by retarding or advancing a closing timing of intake valve 30, for example. A block 360 indicates determination of an intake valve closing timing according to these principals. From block 360, the process and logic of flowchart 300 can loop back to execute again in another engine cycle with a modified intake valve closing timing.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. A method of operating a direct-injection compression-ignition engine comprising:
   moving a piston in a cylinder in the engine from a bottom dead center (BDC) position to a top dead center (TDC) position in an engine cycle;
   injecting early pilot shots of a fuel into the cylinder during the moving of the piston from the BDC position to the TDC position;
   injecting a main charge of the fuel into the cylinder after the injection of the early pilot shots;
   controlling a cylinder temperature timing in the engine cycle such that the cylinder temperature timing is varied relative to cylinder temperature timing in a previous engine cycle;
   combusting the early pilot shots of the fuel in the cylinder, prior to the TDC position of the piston in the engine cycle, according to a combustion phasing that is based on the cylinder temperature timing in the engine cycle and varied relative to combustion phasing in the previous engine cycle; and
   igniting the main charge of the fuel in the cylinder based upon the combustion of the early pilot shots.

2. The method of claim 1 wherein the igniting of the main charge includes igniting the main charge without a spark.

3. The method of claim 1 wherein the combustion phasing of the early pilot shots is dependent, to a greater relative extent, upon the cylinder temperature timing, and a combustion phasing of the main charge is dependent, to a lesser relative extent, upon the cylinder temperature timing.

4. The method of claim 1 wherein the controlling of the cylinder temperature timing includes controlling a closing timing of an intake valve.

5. The method of claim 1 wherein the injecting of the early pilot shots further includes injecting the early pilot shots closer in time to one another than to the injection of the main charge of the fuel.

6. The method of claim 5 wherein the injecting of the early pilot shots further includes injecting 3 or more early pilot shots prior to 60° before the TDC position of the piston.

7. The method of claim 6 wherein the injecting of the early pilot shots further includes injecting 4 or more early pilot shots between 100° before the TDC position of the piston and 70° before the TDC position of the piston.

8. The method of claim 6 further comprising injecting a late pilot shot of the fuel closer in time to the injection of the main charge than to the injection of the early pilot shots.

9. The method of claim 6 further comprising injecting a post shot of the fuel after the injection of the main charge.

10. A direct-injection compression-ignition engine system comprising:
    an electrically actuated fuel injector structured to directly inject a fuel into a cylinder in an engine;
    an electrically actuated cylinder temperature controller;
    a combustion control unit in communication with the fuel injector and with the cylinder temperature controller, the combustion control unit being structured to:
       command actuation of the fuel injector to inject early pilot shots of the fuel into the cylinder during moving a piston in the cylinder from a bottom dead center (BDC) position to a top dead center (TDC) position in an engine cycle;
       command actuation of the fuel injector to inject a main charge of the fuel into the cylinder after injection of the early pilot shots;
       command actuation of the cylinder temperature controller to control a cylinder temperature timing such that the cylinder temperature timing in the engine cycle is varied relative to cylinder temperature timing in a previous engine cycle; and
       phase combustion of the early pilot shots, prior to the TDC position of the piston in the engine cycle, based upon the controlling of the cylinder temperature timing, and such that the phasing of combustion in the engine cycle is varied relative to phasing of combustion in the previous engine cycle.

11. The engine system of claim 10 wherein the cylinder temperature controller includes a variable engine valve actuator.

12. The engine system of claim 10 wherein the combustion control unit is further structured to command actuation of the fuel injector to inject the early pilot shots in a close-coupled cluster of 3 or more pilot shots prior to 60° before the TDC position of the piston.

13. The engine system of claim 12 wherein the combustion control unit is further structured to command actuation of the fuel injector to inject a late pilot shot closer in time to the injection of the main charge than to the close-coupled cluster.

14. The engine system of claim 13 wherein the combustion control unit is further structured to schedule dwell times between the early pilot shots, and between the late pilot shot and the main charge, that are equal.

15. The engine system of claim 14 wherein the dwell times are about 200 microseconds.

16. The engine system of claim 12 wherein the combustion control unit is further structured to command actuation of the fuel injector to inject the early pilot shots between 100° before the TDC position of the piston and 70° before the TDC position of the piston.

17. The engine system of claim 16 wherein the combustion control unit is further structured to command actuation of the fuel injector to inject the early pilot shots between 90° before the TDC position of the piston and 80° before the TDC position of the piston.

18. A combustion control system for an engine comprising:
    a combustion control unit structured to command actuation of a fuel injector, for directly injecting a fuel into a cylinder in the engine, and a cylinder temperature controller, for controlling a cylinder temperature decoupled from a position of a piston within the cylinder; and
    the combustion control unit being further structured to:
       command actuation of the fuel injector to inject early pilot shots of the fuel into the cylinder during moving the piston from a bottom dead center (BDC) position to a top dead center (TDC) position in an engine cycle;

command actuation of the fuel injector to inject a main charge of the fuel into the cylinder after injection of the early pilot shots in the engine cycle;

command actuation of the cylinder temperature controller to control a cylinder temperature timing such that the cylinder temperature timing in the engine cycle is varied relative to cylinder temperature timing in a previous engine cycle; and phase combustion of the early pilot shots, prior to the TDC position of the piston in the engine cycle, based upon the cylinder temperature timing, such that the phasing of combustion in the engine cycle is varied relative to phasing of combustion in the previous engine cycle.

19. The combustion control system of claim 18 further comprising a phasing sensor structured to produce phasing data indicative of heat release from the combustion of early pilot shots in a prior engine cycle, and wherein the combustion control unit is further structured to command the actuation of the cylinder temperature controller based upon the phasing data.

20. The combustion control system of claim 19 wherein the combustion control unit is further structured to:

determine a deviation in the phasing from a desired phasing based on the phasing data; and reduce the deviation in phasing based on the commanded actuation of the cylinder temperature controller.

\* \* \* \* \*

UNITED STATES PATENT AND TRADEMARK OFFICE
CERTIFICATE OF CORRECTION

| | | |
|---|---|---|
| PATENT NO. | : 11,143,137 B1 | Page 1 of 1 |
| APPLICATION NO. | : 16/891170 | |
| DATED | : October 12, 2021 | |
| INVENTOR(S) | : Charlie Chang-Won Kim | |

It is certified that error appears in the above-identified patent and that said Letters Patent is hereby corrected as shown below:

In the Specification

Insert the following two new paragraphs immediately after the title at Column 1:
--Statement of Government Interest
This invention was made with government support under contract DE-EE0008476 awarded by the DOE. The Government has certain rights in this invention.--

Signed and Sealed this
Eighth Day of November, 2022

Katherine Kelly Vidal
*Director of the United States Patent and Trademark Office*